US010163125B2

(12) United States Patent
Hughes et al.

(10) Patent No.: US 10,163,125 B2
(45) Date of Patent: Dec. 25, 2018

(54) SYSTEMS AND METHODS FOR CONDUCTING DYNAMIC MEDIA LIFT STUDIES CONCURRENTLY WITH OPERATING ONLINE ADVERTISING CAMPAIGNS

(71) Applicant: ADOBE SYSTEMS INCORPORATED, San Jose, CA (US)

(72) Inventors: John Hughes, Lafayette, CA (US); Boaz Ram, Sunnyvale, CA (US); Jason Lopatecki, San Francisco, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 401 days.

(21) Appl. No.: 14/946,525

(22) Filed: Nov. 19, 2015

(65) Prior Publication Data

US 2017/0076320 A1    Mar. 16, 2017

Related U.S. Application Data

(60) Provisional application No. 62/216,907, filed on Sep. 10, 2015.

(51) Int. Cl.
*G06Q 30/02* (2012.01)
(52) U.S. Cl.
CPC ..... *G06Q 30/0246* (2013.01); *G06Q 30/0275* (2013.01); *G06Q 30/0277* (2013.01)
(58) Field of Classification Search
None
See application file for complete search history.

(56) References Cited

U.S. PATENT DOCUMENTS

2005/0021397 A1    1/2005  Cui et al.
2010/0306043 A1    12/2010 Lindsay et al.
(Continued)

FOREIGN PATENT DOCUMENTS

WO    WO-2010/138512    12/2010

OTHER PUBLICATIONS

"Understanding Digital Advertising Attribution", 2012, https://www.cognizant.com/InsightsWhitepapers/Understanding-Digital-Advertising-Attribution.pdf.*

(Continued)

*Primary Examiner* — James M Detweiler
(74) *Attorney, Agent, or Firm* — Keller Jolley Preece

(57) ABSTRACT

Systems and methods are disclosed for conducting media lift studies for online advertising concurrently with operating an advertising campaign. While operating an advertising campaign for a first advertiser/client focused primarily on a set of intended ads and a specific targeted viewer audience, a non-intended ad is occasionally substituted to run in an ad slot, and is tracked as belonging to the first advertiser/client. The non-intended ad can be for example one of: an ad for a second advertiser/client; an alternate ad for the first advertiser/client; or a blank/unrelated ad. After the campaign, attribution results for the intended ads are adjusted according to those for non-intended ads to provide an indication of net media lift resulting from the intended ads—typically at no additional cost to the first advertiser/client. Analysis results may also be compared between different attribution data providers to determine which provide the more accurate attribution data.

13 Claims, 3 Drawing Sheets

(56) References Cited

U.S. PATENT DOCUMENTS

| | | | |
|---|---|---|---|
| 2013/0151332 A1 | 6/2013 | Yan et al. | |
| 2013/0297405 A1* | 11/2013 | Farahat | G06Q 30/02 |
| | | | 705/14.43 |
| 2014/0278921 A1* | 9/2014 | Sankaran | G06Q 30/0243 |
| | | | 705/14.44 |
| 2016/0019582 A1* | 1/2016 | Bindra | G06Q 30/0244 |
| | | | 705/14.43 |
| 2016/0055320 A1* | 2/2016 | Wang | G06F 19/00 |
| | | | 705/2 |
| 2016/0275569 A1* | 9/2016 | Zheng | G06Q 30/0277 |
| 2017/0372352 A1 | 12/2017 | Riordan et al. | |
| 2017/0372354 A1* | 12/2017 | Yildiz | G06Q 30/0246 |

OTHER PUBLICATIONS

Glazer, Jeffrey M., "Is a Blank Ad Better Than a Standard Ad", *Madison Beer Review*, located at http://www.madisonbeerreview.com/2010/04/is-blank-ad-better-than-standard-ad.html, (Apr. 23, 2010), 3 pp. total.

Quadlin, Sean, "What to Make of View-through Conversions", *PPC Hero*, located at http://www.ppchero.com/what-to-make-of-view-through-conversions/, (Aug. 5, 2013), 6 pp. total.

Team Position[2], "View-through Conversions", located at http://blogs.position2.com/view-conversions, (Jan. 30, 2015), 7 pp. total.

* cited by examiner

SYSTEMS AND METHODS FOR CONDUCTING DYNAMIC MEDIA LIFT STUDIES CONCURRENTLY WITH OPERATING ONLINE ADVERTISING CAMPAIGNS

CROSS-REFERENCE TO RELATED APPLICATIONS

This application claims the benefit of U.S. Provisional Patent Application No. 62/216,907 filed Sep. 10, 2015.

BACKGROUND OF THE INVENTION

1. Field of the Invention

The present invention relates to online advertisements, and methods for determining the effectiveness of online advertisements.

2. Prior Art

Overview of RTB (Real-Time Bidding):

In the RTB environment for electronic media impression auctions, an electronic advertising agency/consolidator operating a demand-side platform receives billions of daily auction opportunities for electronic media impressions from supply-side partners like for example Google®, Yahoo®, etc. These partners operate auctions for ad impressions and then place electronic ads based on auction results. A supply-side partner's auction is considered an external auction with respect to a demand-side platform where an internal auction may also be operated to determine which advertisements (ads) and bids are submitted to the external auction. Each ad impression (ad slot) opportunity includes information parameters about the ad impression—for example and without limitation, the target media property (website), geolocation of the viewer, ad size, viewer cookie, etc, that are used for targeting purposes. The demand side platform then processes hundreds of ads in their system, supplied by advertiser/clients along with desired filtering/targeting parameters, against information parameters supplied by the supply-side partner, and filters out any ads that do not qualify. For example an ad may not be appropriate to submit if the advertiser does not want the ad to target a particular media property (website), age group, gender, etc. For ads that are not removed due to a mismatch with targeting parameters, the demand-side platform then evaluates the corresponding bids that represent how much each advertiser/client is willing to pay. The winning bid in the internal auction is then sent to the external auction at the supply-side partner to compete for the impression opportunity.

Note that in some scenarios, the electronic advertising agency/consolidator operating a demand-side platform and the advertiser/client may in fact be the same entity—for instance when they comprise a large organization with an internal advertising department capable of acting as a demand-side platform. Also, in such an instance there may be no internal auction—just a submission to an external auction.

Judging Effectiveness of an Advertisement:

Advertiser/Clients in the past have typically judged the success of an advertising campaign based on impressions, on-target impressions, and related GRPs (Gross Rating Points). It is also useful to determine how much each impression influences a conversion event, and the degree to which that influence can be measured is referred to the "media Lift" for the particular ad. Media Lift is computed as the percentage change in awareness or favorability towards a product due to the advertisement. Many 3rd party attribution partners/vendors track online events called conversions or conversion events (purchases, registrations, clicks, etc.) and attempt to "attribute" these conversions to specific ads in order to judge the influence of each ad. For example, the viewer of the ad may have seen both display and video ads for the same item and the attribution company would apply a set of rules to assign partial "conversions" to each ad. So, a specific conversion may be 50% attributed to the video ad, 50% to the display ad. No one really knows if these attribution rules are accurate. Also, such "media lift" studies are always done at additional cost. A better and more accurate solution is to perform such studies during the operation one or more campaigns, and in a manner that provides more accurate results, while adding no associated cost.

Conversion events are a popular means for determining measured campaign results. While "conversion" frequently refers to purchases or sales, conversion events can take many forms. Some non-limiting examples of a conversion event are: purchases/sales; clicks; watching a complete video ad; registering; reading reviews; adding an item to a wishlist; adding an item to a shopping cart; removing an item from a shopping cart; and engaging in a chat—to name only a few.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE PREFERRED EMBODIMENTS

Figure 1:
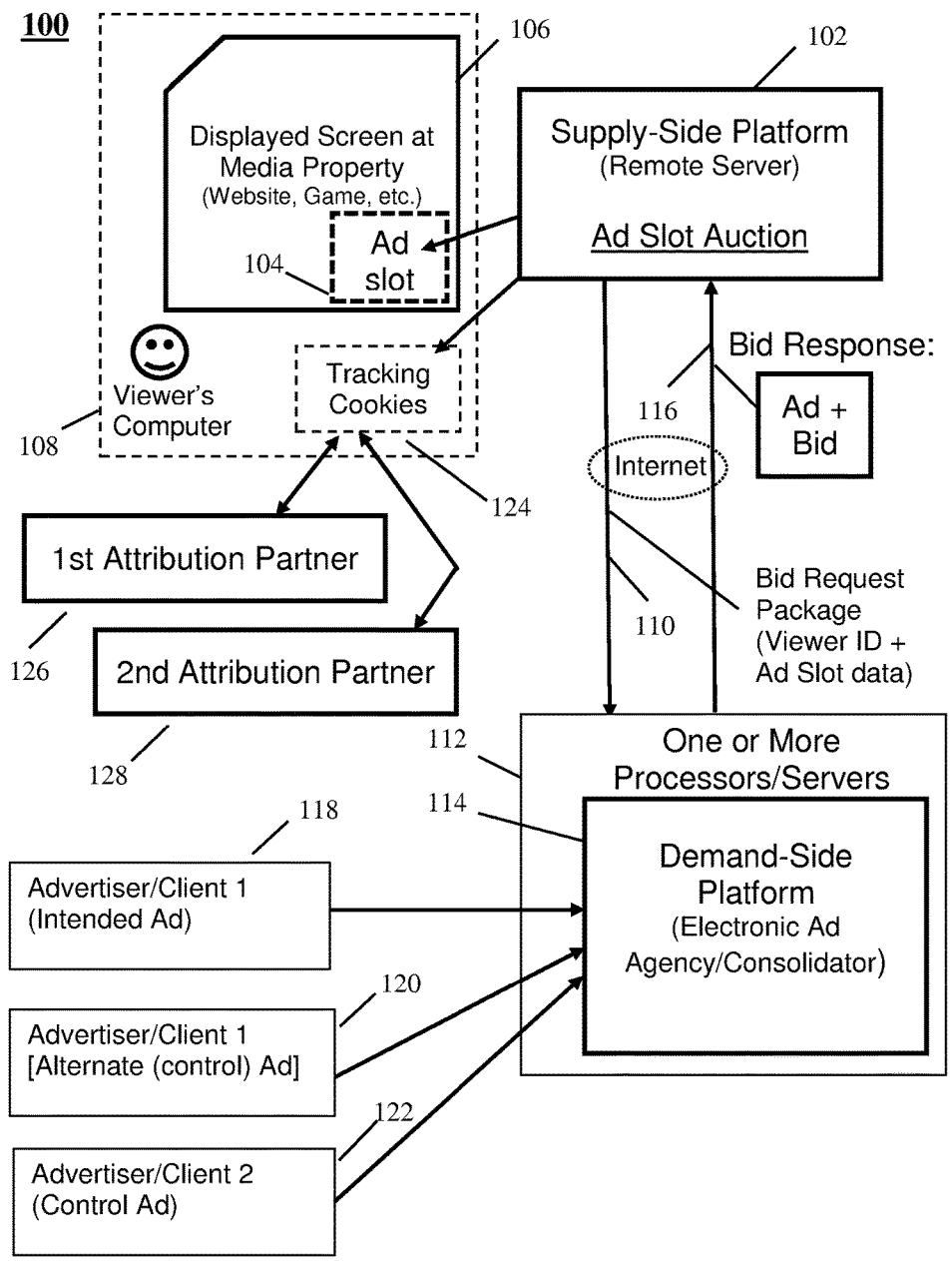
FIG. 1 shows an overview block diagram showing system components and data flow according to the invention.

Systems and methods are disclosed for conducting media lift studies—also referred to as brand lift studies—for online advertising concurrently with operating one or more concurrent advertising campaigns. While operating an advertising campaign for a first advertiser/client focused primarily on a set of intended ads and a specific targeted viewer audience, a non-intended or "control" ad is occasionally substituted to run in an ad slot, however this control ad is tracked for attribution purposes as if it was an intended ad for the first advertiser/client's campaign. The control ad can be one of:

a) an ad for a second advertiser/client;

b) an alternate ad for the first advertiser/client; or c) a blank ad or an unrelated ad such as for example a Public Service ad.

After the campaign, attribution results for the intended ads are adjusted according to attribution results for the control ads to provide an indication of media lift resulting from the intended ads—typically at no additional cost to the first advertiser/client, or to any advertiser/client. Analysis results may also be compared between different attribution partners (attribution data providers) to determine which provide the more accurate attribution data. Multiple attribution data providers may optionally be used to track multiple simultaneous campaigns for different advertiser/clients. In an alternate embodiment of the invention, multiple attribution data providers are used to conduct simultaneous media lift studies for multiple advertiser/clients, while not impacting advertising campaign costs for any of the multiple advertiser/clients.

The invention uses RTB to bid on ad slot opportunities for advertiser/client 1's ad, but occasionally silently selects a 2nd ad that is not even for the same advertiser/client, but is instead an ad from advertiser/client 2. For a certain percentage of advertiser/client 1's ads, a process according to the invention buys the ad spot, but at the last minute places advertiser/client 2's ad instead. Advertiser/client 2 will be billed and their ad will run in reality, but the invention causes advertiser 1's cookie to be dropped on the viewer. The 3rd party attribution partner will think the substitute (control) ad was advertiser/client 1's and partially attribute conversions to the control ad, which wasn't even advertiser/client 1's intended ad and is in reality advertiser/client 2's ad. Thus, the campaign runs in an "always on" fashion, and adds no cost to either advertiser/client 1's campaign or advertiser/client 2's campaign.

The actual mechanism utilized to perform the process described above uses a pixel that is fired to signal the attribution partner that the ad is being viewed, and which ad it is—in this case that the ad is advertiser/client 1's ad (regardless of whose ad it really is). The attribution partner responds by placing/dropping their tracking cookie on the viewer's computer. Thus, the Demand Side Platform causes, indirectly, the tracking cookie to be dropped on the viewer. In the example just described above, the attribution partner will track results for both ads as if they both belonged to advertiser/client 1, even though some of the placements are actually advertiser/client 2's ad. The attribution partner tracks the cookies through future viewer interactions which may include one or more conversion events.

A variation on this process includes a Demand Side Platform performing their own cookie tracking and conversion event attribution. The process is similar to that described above except that there is no need to fire a pixel since the Demand Side Platform is already aware of the ad placement. For this alternate scenario, the Demand Side Platform drops the cookie on the viewer's computer rather than an attribution partner.

In the reporting media lift results, assume for example that the 3rd party attribution data indicates display ads for advertiser/client 1 resulted in 30% of conversions, but the display control (the substituted ads that are really belong to advertiser/client 2) was attributed with 5% of conversions. Then in reporting media lift results, a process according to the invention would adjust the numbers for advertiser/client 1's display ad conversions to 25%. Media lift results are typically supplied to advertiser/clients in electronic form suitable for viewing on a computer display.

Also, a blank ad or any unrelated ad such as for example a Public Service ad can be used as a control ad, yet cause a 3rd party attribution cookie to drop so that the 3rd party attribution partner will partially attribute credit to this (blank) unrelated ad. The attribution for unrelated control ads will be subtracted from the credit attributed to the intended ad to establish a baseline for attribution credit. The substitution of an unrelated ad can optionally be done at no cost to the advertiser.

FIG. 1 shows an overview block diagram showing system components and data flow according to the invention. A supply side platform 102 conducts an ad slot auction for an ad slot 104 to appear on a display provided by media property 106 which may be any electronic display where electronic ads may be shown to a viewer, and in this diagram shown for example on a viewer's computer 108. Non-limiting examples of such electronic displays include personal computers, tablet computers, and smart phones, to name a few. Supply side platform 102 provides a bid request package 110 to a demand-side platform 114 where programming according to the invention runs on one or more processors/servers 112 to execute a complex process, and do so within the milliseconds allotted to respond to the bid request package. Bid request package 110 may include data on the available ad slot and some form of viewer ID. Demand-side platform 114 returns a bid response 116 to supply side platform 102 that includes a bid for the ad slot and the ad to be placed. For one embodiment of the invention, advertisements to be placed may include; an intended ad 118 from advertiser/client 1; an alternate (control) ad 120 from advertiser/client 1; a control ad 122 from advertiser/client 2; or a blank/unrelated ad. For this embodiment, when an ad slot auction is won, advertiser client 114 places one of ads 118, 120, 122, or a blank/unrelated ad, and will cause at least one tracking cookie to be dropped by a $1^{st}$ attribution partner 126. In an alternate embodiment, tracking cookies may also be dropped by a $2^{nd}$ attribution partner 128.

Figure 2:
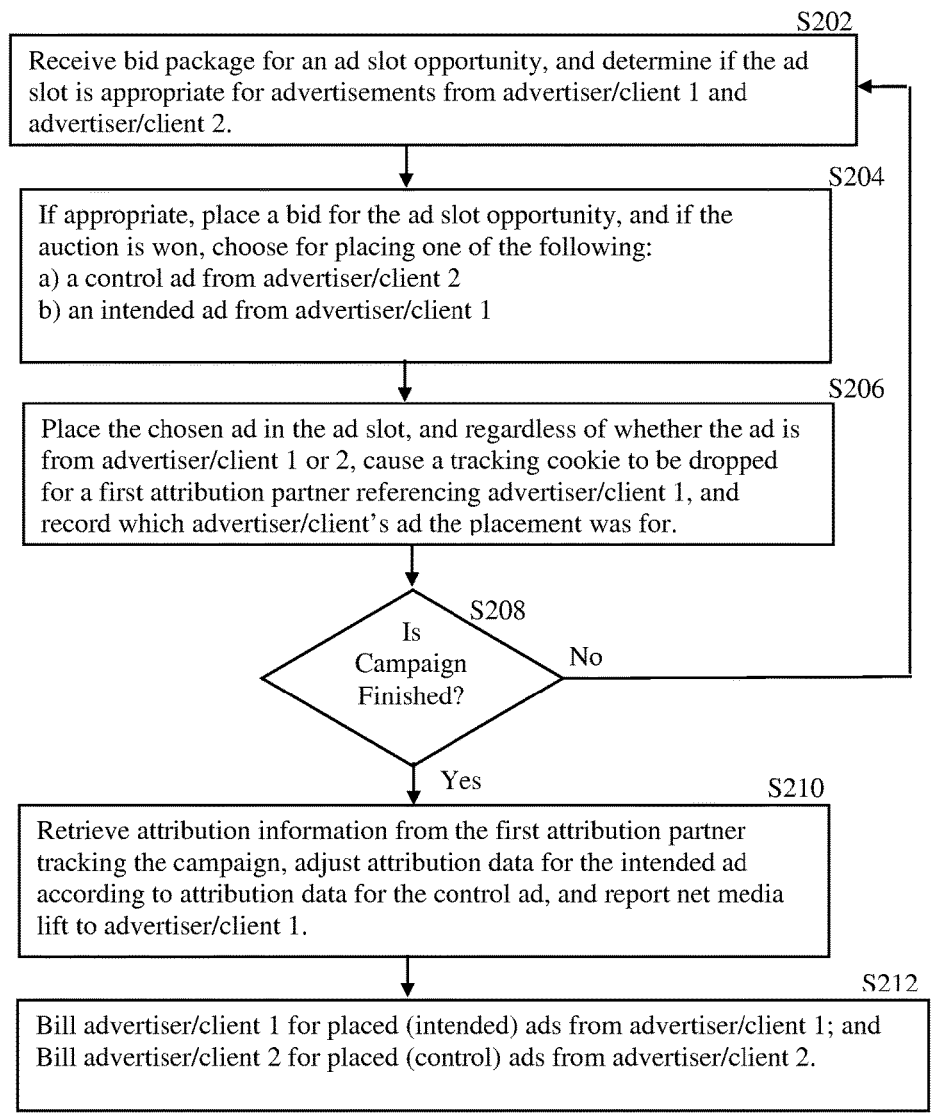
FIG. 2 shows a flow chart for an exemplary and non-limiting embodiment of the invention where a media lift study is conducted for advertiser/client 1 where some ads from advertiser/client 2 act as control ads for advertiser/client 1's campaign, the study conducted at no additional cost to the advertiser/clients.

FIG. 2 shows a flow chart for an exemplary and non-limiting embodiment of the invention where a media lift study is conducted for advertiser/client 1 with some ads from advertiser/client 2 acting as control ads for advertiser/client 1's campaign, and with the study conducted at no additional cost to advertiser/client 1. In step S202, a bid request package is received for an ad slot opportunity, and a process according to the invention automatically determines if the ad slot is appropriate for advertisements from advertiser/client 1 and advertiser/client 2. In step S204 a bid is placed for the ad slot and if the auction is won, the invention chooses either a control ad from advertiser/client 2 or an intended ad from advertiser client 1 to be placed in the ad slot. In step S206, the chosen ad is placed, and regardless of whether the ad is from advertiser/client 1 or advertiser client 2, a tracking cookie is dropped by a $1^{st}$ attribution partner referencing advertiser/client 1's ad. Also, whichever advertiser/client's ad the placement was for is recorded. In step S208, the progress of the campaign is compared with a completion target, and if the campaign is not finished it proceeds back to step S202. If per step S208 the campaign has completed, then the process proceeds to step S210 where information is retrieved from the $1^{st}$ attribution partner. Attribution data for the intended ad is then adjusted according to attribution data for the control ad, and the net media lift resulting from this adjustment is presented to advertiser client 1, thereby providing a more accurate media lift analysis for advertiser/client 1's intended ad. Finally per step S212, advertiser client 1 is billed for placements of the intended ad, and advertiser/client 2 is billed for placements of the control ad.

Note that the control ad can be a blank or unrelated ad, and when it is placed a cookie is dropped by the $1^{st}$ attribution partner referencing advertiser/client 1's intended ad. Advertiser/client 1 may be billed, or not billed, for the blank/unrelated ad placement.

Figure 3:
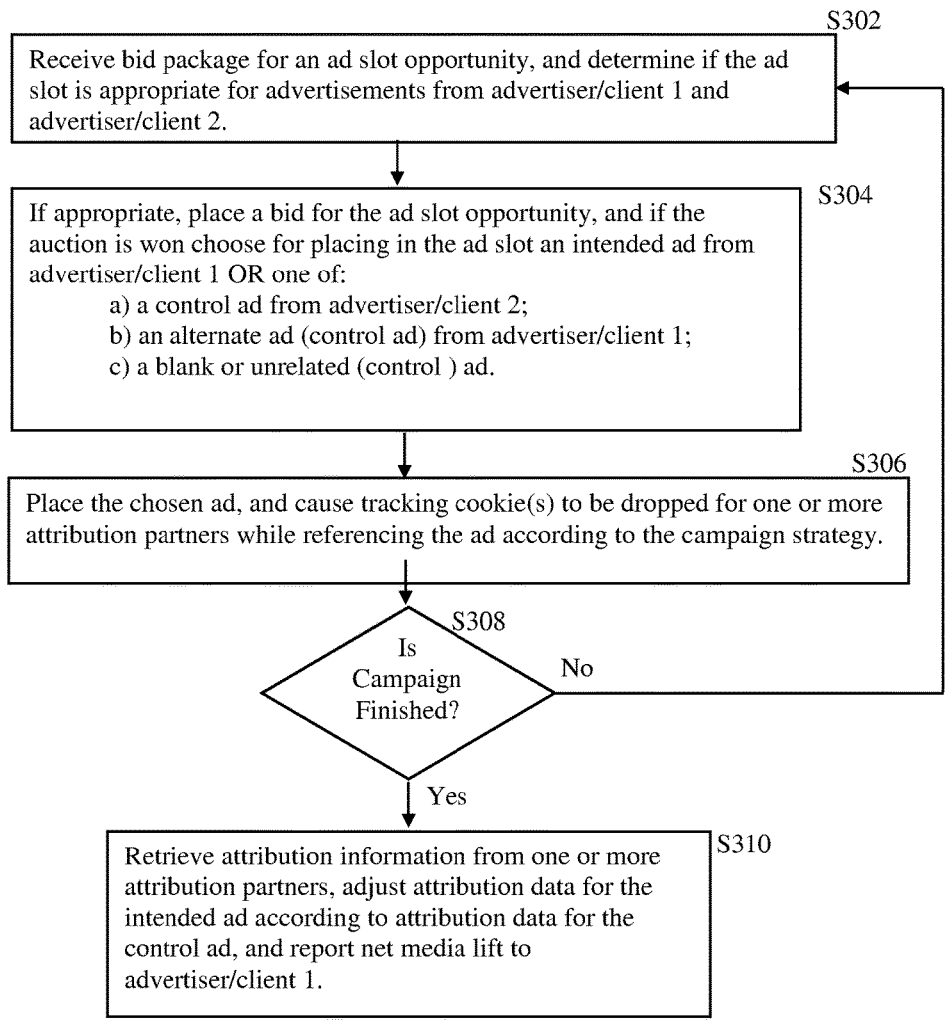
FIG. 3 shows a flow chart for an exemplary and non-limiting embodiment of the invention depicting a generalized flow for campaign management with always-on media lift studies.

FIG. 3 shows a flow chart for exemplary and non-limiting embodiments of the invention depicting a generalized flow for campaign management with always-on media lift studies. In step S302 a bid package is received for an ad slot opportunity, and a process according to the invention determines if the ad slot is appropriate for advertisements from advertiser/client 1 and advertiser/client 2. If appropriate, per step S304 an ad is placed for the ad slot opportunity, and if the auction is won, the process chooses for placing in the ad slot an intended ad from advertiser/client 1 or one of the following:

a) a control ad from advertiser/client 2;
b) an alternate ad (control ad) from advertiser/client 1; or
c) a blank or unrelated (control) ad.

In step S306, the chosen ad is placed in the ad slot, and one or more tracking cookies is dropped for one or more attribution partners referencing the chosen ad according to the campaign strategy. If the placement is for the intended ad from advertiser/client 1, then the tracking cookie is dropped by a $1^{st}$ attribution partner and references the intended ad. If the placement is for the control ad from advertiser/client 2, then one tracking cookie is dropped by a $1^{st}$ attribution partner referencing the intended ad (advertiser/client 1's ad)—and another tracking cookie is optionally dropped by a $2^{nd}$ attribution partner referencing the control ad (advertiser/client 2's ad), so that advertiser/client 2 will still receive attribution information even when their ad is used as a control ad in advertiser/client 1's media lift study.

In step S308, the progress of the campaign is compared with a completion target, and if the campaign is not finished it proceeds back to step S302. If per step S308 the campaign has completed, then the process proceeds to step S310 where information is retrieved from at least the $1^{st}$ attribution partner. Attribution data for the intended ad is then adjusted according to attribution data for the control ad, and the net media lift resulting from this adjustment is presented to advertiser client 1, thereby providing a more accurate media lift analysis for advertiser/client 1's intended ad. If a $2^{nd}$ tracking cookie was dropped for a $2^{nd}$ attribution partner when the control ad is placed, then attribution information may also be reported to advertiser/client 2 for placements of their ad (the control ad) as part of advertiser/client 2's campaign. Subsequently, advertiser client 1 is billed for placements of the intended ad, and advertiser/client 2 is billed for placements of the control ad and any other placements of advertiser/client 2's ad. Results of media lift studies for all embodiments described herein are typically provided to advertiser/clients at least in electronic form suitable for display on a computer display.

Note that for alternate embodiments of the invention, advertiser/client 1 may in fact be the same entity as advertiser/client 2. As such, the control ad from advertiser/client 2 would be in actuality an alternate ad from advertiser/client 1.

In another alternate embodiment of the invention, it is possible to run simultaneous media lift studies for both advertiser/client 1 and advertiser/client 2 at no additional cost to either advertiser. For this embodiment, a portion of advertiser/client 1's intended ads become control ads for advertiser/client 2's campaign, and likewise a portion of advertiser/client 2's intended ads become control ads for advertiser/client 1's campaign, with both campaigns running simultaneously. So for this embodiment, when advertiser/client 2's intended ad is placed as a control ad for advertiser/client 1's campaign, two cookies would be dropped:

a) one cookie by the $1^{st}$ attribution partner referencing advertiser 1's ad; and
b) one cookie by the $2^{nd}$ attribution partner referencing advertiser 2's ad.

Likewise, when advertiser/client 1's intended ad is placed as a control ad for advertiser/client 2's campaign, two cookies would be dropped:

a) one cookie by the $1^{st}$ attribution partner referencing advertiser 1's ad; and
b) one cookie by the $2^{nd}$ attribution partner referencing advertiser 2's ad.

Subsequently when both campaigns have completed, attribution data is retrieved from both the $1^{st}$ and $2^{nd}$ attribution partners, and reconciled. Net media lift results for advertiser/client 1's campaign is computed by subtracting conversion results for the control ad (from advertiser/client 2) from conversion results for advertiser/client 1's intended ad. Likewise, net media lift results for advertiser/client 2's campaign is computed by subtracting conversion results for the control ad (from advertiser/client 1) from conversion results for advertiser/client 2's intended ad.

Note that the quantity and complexity of the data and tasks involved in operating the invention make implementation of the invention impossible without the aid of one or more sequential machines—typically sequential processes operating on the one or more processors referred to above—and also use of a hardware communications infrastructure—typically the Internet. During the analysis and actionable processes involved, millions of data elements must be considered and without using a machine as part of the invention, implementation of the claimed processes would not be possible. Typically a Demand Side Platform (DSP) MUST both analyze and respond to an ad slot opportunity in less than 250 milliseconds. This response time limit is generally understood throughout the online advertising community, and while the time limit may vary from one supply-side platform to another, is always less than 250 mS. To date, applicant has seen bid response time limits typically between 70 and 100 mS with some ranging up to 150 mS. Note that this rapid succession of events comprising applicant's processes as claimed is necessary such that when a viewer goes to a webpage, the locations for advertisements on that page will not be initially shown as blank boxes.

Performing the claimed processes to provide this response time with "pencil and paper" is impossible for many reasons, as is performing the claimed processes without the Internet. In fact, the entire process with respect to online advertisements requires an intimate usage of the Internet for the Demand Side Platform to communicate via the communications network (Internet) with: supply-side platforms; advertising exchanges; advertising networks; and attribution partners. The DSP must receive bid request packages, determine if and how much to bid, and supply the ads themselves in less than 250 milliseconds via the Internet. If the DSP fails to perform these processes within the time limit specified by the supply-side platform, the submitted bid will be ignored. Then, after a campaign has run, the DSP automatically receives attribution data from attribution partners, and uses the attribution data to automatically determine media lift. The preceding description names only some of the automated processes and actions involved in implementing the invention as claimed.

The claims reflect a computerized process since, at this time, computing resources have evolved to include "Cloud-based" computing as described above in the Background section. As such, it is also impossible to predict where (physically) the claimed processes will be executed and/or if they will be distributed across multiple machines. It is also impossible to predict the specific ownership of machines whereupon the claimed processes will be executed, and therefore against whom the claims would protect against should the claims instead have been written as system claims as opposed to the method claims attached hereto.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

At least certain principles of the invention can be implemented as hardware, firmware, software or any combination thereof. Moreover, the software is preferably implemented as an application program tangibly embodied on a program storage unit, a non-transitory machine readable medium, or a non-transitory machine-readable storage medium that can be in a form of a digital circuit, an analog circuit, a magnetic medium, or combination thereof. The application program may be uploaded to, and executed by one or more machines comprising any suitable architecture. The various processes and functions described herein may be either part of microinstruction code or part of one or more application programs, or any combination thereof, which may be executed by one or more CPUs, whether or not such machine(s) or processor(s) are explicitly shown. In addition, various other peripheral units may be connected to machine platforms such as one or more data storage units and printing units.

What is claimed is:

1. A computerized method wherein one or more processors analyze media lift concurrently with operating an online advertising campaign comprising:
   receiving an intended advertisement from a first advertiser;
   receiving a control advertisement from a second advertiser, wherein the control advertisement is a different advertisement than the intended advertisement;
   placing instructions in the intended advertisement that cause a first attribution tracking cookie to be placed on a viewing user's computer when the intended advertisement is presented on the viewing user's computer, wherein the first attribution tracking cookie references the intended advertisement;
   placing second instructions in the control advertisement that cause a second attribution tracking cookie to be placed on a second viewing user's computer when the control advertisement is presented on the second viewing user's computer, wherein the second attribution tracking cookie references the control advertisement;
   placing third instructions in the control advertisement that cause the first attribution tracking cookie to be placed on the second viewing user's computer when the control advertisement is presented on the second viewing user's computer, wherein the first attribution tracking cookie references the intended advertisement;
   providing the intended advertisement for placement in one or more advertisement slots;
   providing the control advertisement for placement in one or more advertising slots, wherein providing of the intended advertisement or the control advertisement is determined for each separate user view of a respective advertisement slot;
   receiving a first set of conversion events, wherein each conversion event in the first set of conversion events references the intended advertisement and was received, at least in part, responsive to respective placements of the first attribution tracking cookie;
   receiving a second set of conversion events, wherein each conversion event in the second set of conversion events references the control advertisement and was received, at least in part, responsive to respective placements of the second attribution tracking cookie; and
   determining media lift results for the intended advertisement by subtracting a total number of conversion events respectively referencing both the intended advertisement and the control advertisement from a total number conversion events respectively referencing only the intended advertisement.

2. The computerized method of claim 1, further comprising providing a report with the media lift results for the intended advertisement to the first advertiser.

3. The computerized method of claim 1, wherein the first and second advertiser comprise the same advertiser, and the control advertisement comprises an alternate advertisement related to a different product or service than the intended advertisement.

4. The computerized method of claim 1, wherein the control advertisement is a blank advertisement.

5. The computerized method of claim 1, further comprising causing the intended advertisement or the control advertisement to be placed in respective advertisement slots by:
   receiving bid request packages for advertisement slot opportunities for the advertisement slot, wherein the bid request packages comprise of one or more intended advertisement bids and one or more control advertisement bids;
   causing the intended advertisement to be placed in the advertisement slot when an intended advertisement bid is greater than a control advertisement bid; and
   causing the control advertisement to be placed in the advertisement slot when the control advertisement bid is greater than the intended advertisement bid.

6. A system comprising:
   at least one processor, and
   at least one non-transitory computer-readable storage medium storing instructions thereon that, when executed by the at least one processor, cause the system to:
   receive an intended advertisement-from a first advertiser;
   receive a control advertisement from a second advertiser, wherein the control advertisement is a different advertisement than the intended advertisement;
   place instructions in the intended advertisement that cause a first attribution tracking cookie to be placed on a viewing user's computer when the intended advertisement is presented on the viewing user's computer, wherein the first attribution tracking cookie references the intended advertisement;
   place second instructions in the control advertisement that cause a second attribution tracking cookie to be placed on a second viewing user's computer when the control advertisement is presented on the second viewing user's computer, wherein the second attribution tracking cookie references the control advertisement;
   place third instructions in the control advertisement that cause the first attribution tracking cookie to be placed on the second viewing user's computer when the control advertisement is presented on the second viewing user's computer, wherein the first attribution tracking cookie references the intended advertisement;
provide the intended advertisement for placement in one or more advertisement slots;
provide the control advertisement for placement in one or more advertising slots, wherein providing of the intended advertisement or the control advertisement is determined for each separate user view of a respective advertisement slot;
receive a first set of conversion events, wherein each conversion event in the first set of conversion events references the intended advertisement and was received, at least in part, responsive to respective placements of the first attribution tracking cookie;
receive a second set of conversion events, wherein each conversion event in the second set of conversion events references the control advertisement and was received, at least in part, responsive to respective placements of the second attribution tracking cookie; and
determine media lift results for the intended advertisement by subtracting a total number of conversion events respectively referencing both the intended advertisement and the control advertisement from a total number conversion events respectively referencing only the intended advertisement.

7. The system of claim 6, further comprising instructions that, when executed by the at least one processor, cause the system to provide a report with the media lift results for the intended advertisement to the first.

8. The system of claim 6, wherein the first and second advertiser comprise the same advertiser, and the control advertisement comprises an alternate advertisement related to a different advertisement campaign than the intended advertisement.

9. The system of claim 6, wherein the control advertisement is a blank or unrelated advertisement.

10. A non-transitory computer readable medium storing instructions thereon that, when executed by at least one processor, cause a computing device to:
receive an intended advertisement from a first advertiser;
receive a control advertisement from a second advertiser, wherein the control advertisement is a different advertisement than the intended advertisement;
place instructions in the intended advertisement that cause a first attribution tracking cookie to be placed on a viewing user's computer when the intended advertisement is presented on the viewing user's computer, wherein the first attribution tracking cookie references the intended advertisement;
place second instructions in the control advertisement that cause a second attribution tracking cookie to be placed on a second viewing user's computer when the control advertisement is presented on the second viewing user's computer, wherein the second attribution tracking cookie references the control advertisement;
place third instructions in the control advertisement that cause the first attribution tracking cookie to be placed on the second viewing user's computer when the control advertisement is presented on the second viewing user's computer, wherein the first attribution tracking cookie references the intended advertisement;
provide the intended advertisement for placement in one or more advertisement slots;
provide the control advertisement for placement in one or more advertising slots, wherein providing of the intended advertisement or the control advertisement is determined for each separate user view of a respective advertisement slot;
receive a first set of conversion events, wherein each conversion event in the first set of conversion events references the intended advertisement and was received, at least in part, responsive to respective placements of the first attribution tracking cookie;
receive a second set of conversion events, wherein each conversion event in the second set of conversion events references the control advertisement and was received, at least in part, responsive to respective placements of the second attribution tracking cookie; and
determine media lift results for the intended advertisement by subtracting a total number of conversion events respectively referencing both the intended advertisement and the control advertisement from a total number conversion events respectively referencing only the intended advertisement.

11. The non-transitory computer readable medium of claim 10, further comprising instructions that, when executed by the at least one processor, cause the computing device to provide a report with media lift results for the intended advertisement to the first advertiser.

12. The non-transitory computer readable medium of claim 10, wherein the first and second advertiser comprise the same advertiser, and the control advertisement comprises an alternate advertisement related to a different advertisement campaign than the intended advertisement.

13. The non-transitory computer readable medium of claim 10, wherein the control advertisement is a blank advertisement or an unrelated advertisement.

* * * * *